Nov. 2, 1926. 1,605,602
W. H. MOYSE
ADJUSTABLE SEAT FOR MOTOR VEHICLES
Filed Nov. 2, 1923
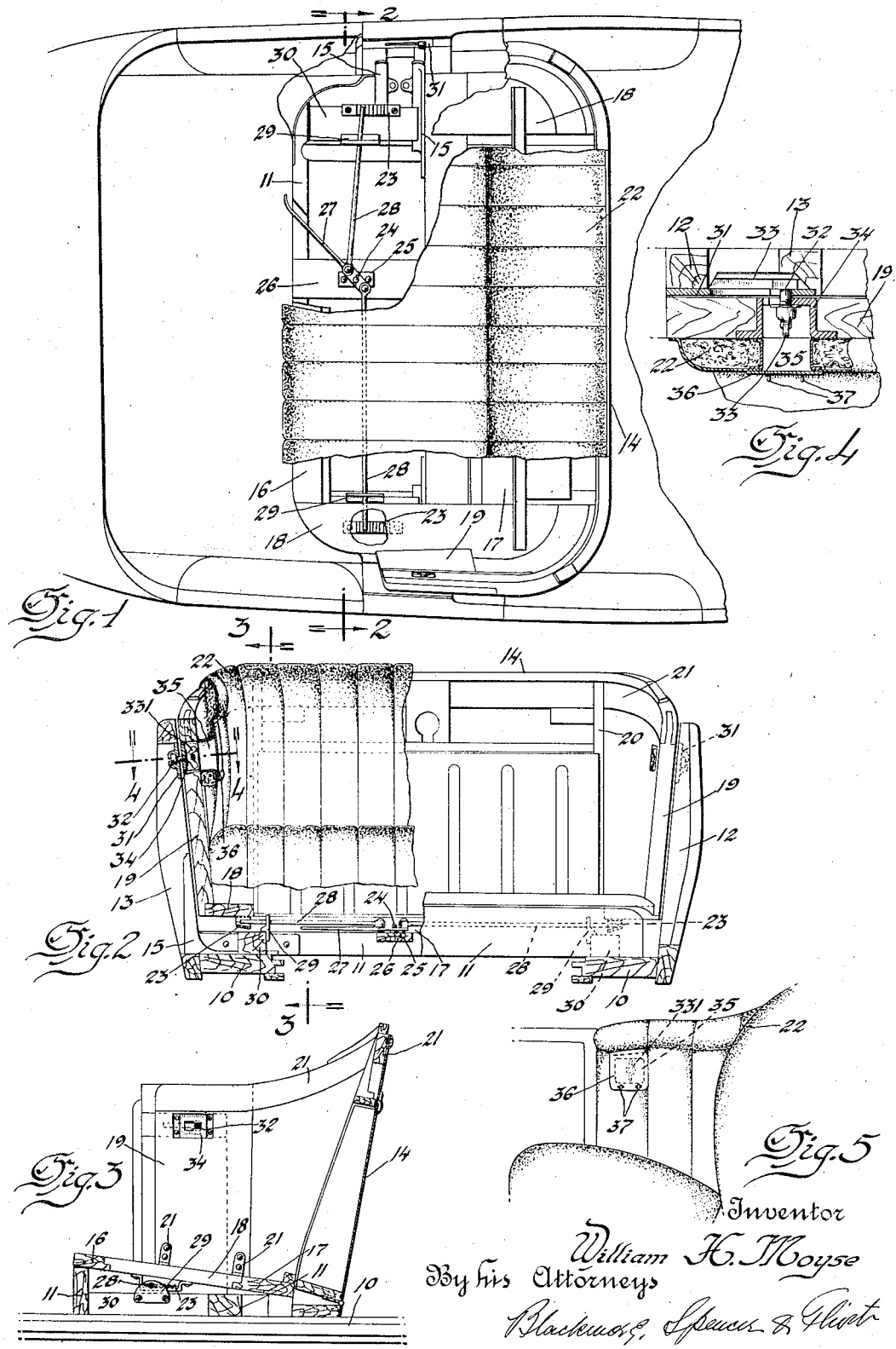

Patented Nov. 2, 1926.

1,605,602

UNITED STATES PATENT OFFICE.

WILLIAM H. MOYSE, OF OSHAWA, ONTARIO, CANADA, ASSIGNOR TO GENERAL MOTORS CORPORATION, OF DETROIT, MICHIGAN, A CORPORATION OF DELAWARE.

ADJUSTABLE SEAT FOR MOTOR VEHICLES.

Application filed November 2, 1923. Serial No. 672,405.

The invention herein relates to front seats for automobiles of the type or class which are made adjustable, in order that the position of the driver may be properly related to the steering and controlling mechanism of the vehicle; and the principal object thereof is to provide an improved adjustable front seat construction wherein the seat may be adjusted forwardly and rearwardly, as has heretofore been the case, but wherein a much stronger connection is provided between the seat and the vehicle body than heretofore in order that the seat and body may mutually brace one another, and a strong and rigid construction provided for the front seat and the adjacent portions of the vehicle body.

In carrying out my invention I have provided a front seat which is supported as usual from the longitudinally extending sills and floor of the vehicle body, together with improved mechanism for fastening the lower part of the seat in its adjusted positions, and provided also suitable fastening devices whereby the upper ends of the sides of the seat are secured to adjacent side portions of the vehicle body; so that the seat is secured at its bottom portion directly to the floor and sills of the vehicle, and secured at its side portions at the top thereof, and preferably at the front ends of the sides, directly to the adjacent sides of the body of the vehicle; thereby and in addition to providing adjustability as regards the seat securing an exceedingly strong body and seat construction at and in the vicinity of the front seat.

With the above and other objects of invention in view my invention consists in the improved adjustable front seat mechanism and features illustrated in the accompanying drawing, described in the following specification, and particularly claimed in the concluding claims; and in such variations and modifications thereof, within the scope of the concluding claims, as will be obvious to those skilled in the art to which my invention relates.

Referring now to the drawing wherein the preferred embodiment of my invention is illustrated, and wherein like reference numerals designate the same parts in the several views:

Figure 1 is a fragmentary plan view of my invention showing its application to a vehicle body, the upholstery of the adjustable front seat being for the most part omitted in order to better show the frame work of the seat and mechanism for securing the seat in its adjusted positions.

Figure 2 is a similar view as seen from a position in front of the seat, this view being taken upon a vertical transverse plane, the position of which is indicated approximately by the line 2—2, Figure 1.

Figure 3 is a view taken upon a vertical longitudinal plane indicated approximately by the line 3—3, Figure 2, looking toward the left.

Figure 4 is a fragmentary view taken upon a horizontal plane indicated approximately by the line 4—4, Figure 2.

Figure 5 is a fragmentary view illustrating a detail of my invention.

Referring now to the drawing, and bearing in mind the fact that the same shows such features only as are necessary to an understanding of my invention, the reference numerals 10, 10 designate longitudinally extending side sills, and the numerals 11 designate transversely extending sills extending between said side sills and secured at their ends thereto; these members constituting the main base frame of the vehicle body. It will be appreciated that these members and the body so far as illustrated are shown in a conventional manner only and will vary in form and arrangement of the parts thereof in various types of vehicle bodies, and that the floor boards which are supported from said longitudinal sills are not shown.

Extending upward from the base frame above referred to are various posts which support the outer metallic shell or covering of the body which again will vary in arrangement in different types of body construction. Two of these posts upon each side of the body, however, which are concerned with my invention in the particular form thereof illustrated, are indicated by the reference numerals 12, 13; these being arranged in pairs upon opposite sides of the body and their position being adjacent the front ends of the side portions of the seat, which is designated as a whole by the reference numeral 14. The lower ends of the posts 12, 13 are braced by suitable braces 15 having lower arms extending along the cross sills 11, and the upwardly extending arms of which are secured to the posts aforesaid, in the form of my invention illustrated. It will be appreciated, however, that each pair of posts form in effect a single upright structure contributing to the support of the external metallic or other shell of the vehicle body and to which the upper ends of the sides of the seat are secured adjacent the front ends of the sides, as will hereinafter appear.

The seat 14 as will be appreciated includes a frame structure having a lower base portion made up of front and rear transverse sills 16, 17 connected at their ends by end sills 18; two upwardly extending side members or posts 19 secured at their lower ends to the base frame, and shown as in the form of boards of considerable width as compared with their thickness; suitable rear posts 20; and a top rail 21 forming the sides and back of the seat frame and which is secured to the upper ends of the side posts or members 19 and the rear posts 20. The side boards or posts 19 are braced from the base frame by suitable braces 21, and the seat frame as a whole will be lined with suitable upholstery 22, as will be appreciated.

Secured to the under sides of the end members 18 of the base of the seat frame are two racks 23, one at each side of the seat, which racks are provided with series of teeth whereby intervening depressions are provided; these racks being inclined downward slightly towards the center line of the seat in order to produce a wedging action of the fastening mechanism which secures the seat to the main sills and floor of the body as will next appear. These racks are in the form of stirrups let down below the level of the under side of the seat frame, as will be understood from Figures 2 and 3, and the grooves or depressions formed in them by the teeth as aforesaid provide for the adjustment of the seat in various longitudinal positions relative to the vehicle body and to the steering post and control mechanism for the vehicle.

Pivotally supported at 24 from a plate 25 carried on a bar 26, the ends of which are secured to the transversely extending sills 11, is a lever 27 which extends forwardly beyond the front cross sill 11 of the said frame, and the free end of which lies just underneath the front edge of the seat; so that said free end may be readily grasped when the position of the seat is to be changed, during which operation the forward end of the lever moves in a slot in the upper edge of the transverse sill member 11 of the body frame.

Secured adjacent the pivotal point 24 of the lever 27 and upon opposite sides thereof are the inner ends of two reciprocating rods 28, which rods extend to and terminate adjacent the racks 23; the outer ends of said rods being slidably supported in brackets 29 resting upon and suitably secured to blocks 30 which are secured to the longitudinal sills 10 of the vehicle body; from which it follows that when the forward end of the lever 27 is swung in a counter-clockwise direction the rods 28 will be moved inward and their free outer ends, which are guided by the guides 29, will be moved out of engagement with the racks 23; thus permitting the entire seat structure to be moved in a fore and aft direction relative to the vehicle body. After the seat has been properly placed and upon swinging the lever 27 in a reverse direction the outer ends of said rods 28 will engage depressions in the racks 23 opposite which they lie and, as the lever is forced into its final position, the rods will exert a downward pull which acts to force the base frame of the seat into firm engagement with the longitudinal and transverse sills of the vehicle body; this clamping action being due to the fact that the surfaces of the racks with which the ends of the rods engage are inclined, thereby producing a wedging action which tends to force the seat frame downward as the lever 27 approaches its final position. When in its final position it will be seen that the free end of the lever 27 lies beneath the front edge of the seat and out of the way, while at the same time said front end is in a position just in front of the sill 11 so that it may be readily grasped to loosen the seat and permit the adjustment thereof.

Obviously the fact that the racks 23 are provided with teeth between which the extremities of the locking rods lie when the seat is locked in position provides a construction in which the seat is restrained from front and rear movement when the same is locked, with the extremities of the rods 28 lying in depressions between the teeth.

The improved locking mechanism above referred to provides for the securing of the lower base portion of the seat to the frame of the vehicle body in whatever position it may be adjusted, and may be used alone if the base only of the seat need be locked to the vehicle body. My invention, however, regarded more specifically, includes fastening means for locking the upper side portions of the seat to the adjacent side portions of the vehicle body; said means being shown as comprising the following elements. That is to say, the reference numerals 31 designate two oppositely disposed plates the ends of which are fastened to the upper ends of the side body ports 12, 13 as by means of suitable screws, and which plates have longitudinally extending slots enlarged at one end in order to admit the square heads of fastening bolts 32; said bolts being slidable in said slots as the seat is adjusted and said plates preferably having guides 33 which extend and overlie the heads of the bolts so that they cannot move outward and fall down into the space between the posts 12, 13 should the nuts be removed from the bolts. These bolts extend through holes provided in plates 34 of stirrup-like form and which are let into openings provided adjacent the upper ends of the side members 19 at the front ends of the sides of the seat frame; from which it follows that upon loosening the nuts 331, these preferably being wing nuts so that they may be more easily manipulated, the entire seat structure may be moved in a fore and aft direction; the bolts meanwhile sliding in the slots in the plates 31. After the seat has been properly placed and the nuts tightened the sides of the seat adjacent their front ends will be firmly fastened to the upper ends of the side portions of the vehicle body; thus providing a seat structure in which the base portion thereof is secured direct to the base frame of the body, as hereinbefore explained, while the upper ends of the side portions thereof are fastened to adjacent side portions of the vehicle body.

The seat upholstery 22 is or may be of usual or conventional form except that the same is provided with openings 35 over the wing nuts 331 whereby access may be had thereto, and which openings are closed by flaps 36 having separable fasteners 37 of any suitable form adjacent their lower edge. This construction provides seat upholstery which is continuous and uniform and of pleasing appearance throughout and over the nuts aforesaid, and at the same time provides a construction wherein and upon loosening the flaps 36 and swinging them upward access may be had to the wing nuts, and the seat as a whole adjusted in the manner hereinbefore explained.

Having thus described and explained my invention I claim and desire to secure by Letters Patent:

1. In combination with an automobile body having a bottom portion, and upwardly extending sides; a unitary rigid seat structure located within and adjustable longitudinally of said body and having a back, a lower base portion supported by and slidable upon said bottom portion, and side portions extending upwardly from said base portion lying adjacent the sides aforesaid; means for securing the base portion of said seat to the bottom of the body in various positions in which it may be placed; and means for securing the upper ends of the sides of the seat and adjacent portions of the sides of the body together.

2. In combination with an automobile body having a bottom portion, and upwardly extending sides; a unitary rigid seat structure located within and adjustable longitudinally of said body and having a back, a lower base portion supported by and slidable upon said bottom portion, and side portions extending upwardly from said base portion and lying adjacent the sides aforesaid; fastening mechanism operable from in front of the seat, and whereby said seat may be secured to the bottom of the body in various positions; and fastening members located one at each side of the seat, and whereby said sides may be fastened to the sides of the body.

3. In combination with an automobile body having a bottom portion, and upwardly extending sides; a unitary rigid seat structure located within and adjustable longitudinally of the body and comprising a frame structure having a back, a lower base portion supported by and slidable upon said bottom portion, and side members extending from said base portion upwardly and located adjacent the sides aforesaid of the body; fastening mechanism carried by and arranged beneath the base portion of said seat frame for holding the seat in various positions to the bottom of the body in which it may be placed; and fastening devices associated one with each of the side members aforesaid, and whereby said members and adjacent portions of the sides of the body may be secured together.

4. In combination with an automobile body having a bottom portion, and upwardly extending sides; a unitary rigid seat structure located within and adjustable longitudinally of the body and comprising a frame structure having a back portion, a lower base portion supported by and slidable upon said bottom portion, and side members extending from said base portion upwardly and located adjacent the sides aforesaid of the body; fastening mechanism carried by and arranged beneath said seat and operable from the front side or edge thereof for securing the same to the bottom of the body in various positions in which it may be placed; and fastening devices associated one with each of the side members aforesaid, and whereby the upper ends of said side members may be fastened to adjacent portions of the sides of the body.

5. In combination with an automobile body having a bottom portion, and upwardly extending sides; a unitary rigid seat structure located within and adjustable longitudinally of the body and comprising a frame structure having a back portion, a lower base portion supported by and slidable upon said bottom portion and side members extending from said base portion upwardly and located adjacent the sides aforesaid of the body; two reciprocating rods carried by and located beneath said seat; means for moving said rods as aforesaid; holding members carried by the bottom of the body and located adjacent the sides of the seat and with which the ends of said rods cooperate to fasten the seat to the bottom of the body; and fastening devices associated one with each of the side members aforesaid, and whereby the upper ends of said side members may be fastened to adjacent portions of the sides of the body.

6. In combination with an automobile body having a bottom portion, and upwardly extending sides; a unitary rigid seat structure located within and adjustable longitudinally of the body and comprising a frame structure having a back portion, a lower base portion supported by and slidable upon said bottom portion, and side members extending from said base portion upwardly and located adjacent the sides aforesaid of the body; an oscillating lever supported by the base portion of said seat frame, and the free end of which extends to and lies adjacent the front edge of the seat; two rods the inner ends of which are pivotally connected with said lever, and the outer ends of which lie beneath said seat frame and adjacent the sides thereof; holding members carried by the body and located adjacent the sides of the seat and with which the ends of said rods cooperate to fasten the seat to the bottom of the body; and fastening devices associated one with each of the side members aforesaid, and whereby the upper ends of said side members may be fastened to adjacent portions of the sides of the body.

7. In combination with an automobile body, a seat slidable longitudinally upon the bottom of the body and comprising a frame structure having a base portion; an oscillating lever supported by said base portion, and the free end of which extends to and lies adjacent the front edge of the seat; two rods the inner ends of which are pivotally connected with said lever, and which rods extend outward and terminate adjacent the sides of the seat; two brackets secured to the bottom of the body and located adjacent the ends of said rods, and having holes through which the ends of said rods slide; and two racks carried by the base portion aforesaid and having inclined grooves with which the extremities of said rods engage.

8. In combination with an automobile body, a unitary rigid seat structure slidable longitudinally upon the bottom of the body and comprising a frame structure having a back portion and a base portion, and upwardly extending side portions; an oscillating lever supported by said base portion, and the free end of which extends to and lies adjacent the front edge of the seat; two rods the inner ends of which are pivotally connected with said lever, and which rods extend outward and terminate adjacent the sides of the seat; two brackets secured to the bottom of the body and located adjacent the ends of said rods, and having holes through which the ends of said rods slide; holding members carried by the base portion aforesaid and with which the extremities of said rods engage; slotted plates carried by the sides of the body and located adjacent the upper ends of the side portions aforesaid of said seat frame; plates carried by the upper ends of said side portions; and fastening bolts extending through holes in said last mentioned plates and the heads of which are slidable in the slots of said slotted plates.

9. In combination with an automobile body, a unitary rigid seat structure slidable longitudinally upon the bottom of the body and comprising a frame structure having a back portion and a base portion, and upwardly extending side portions; fastening mechanism associated with the base portion of said seat frame and adapted to secure the same to the bottom of said body; slotted plates carried by the sides of the body and located adjacent the upper ends of the side portions aforesaid of said seat frame; plates carried by the upper ends of said side portions; and fastening bolts extending through holes in said last mentioned plates and the heads of which are slidable in the slots of said slotted plates.

In testimony whereof I affix my signature.

WILLIAM H. MOYSE.